Feb. 17, 1942.                 J. G. KLEINHENZ                 2,273,112
                          COLOR CAMERA AND PROJECTOR
                            Filed Jan. 23, 1941
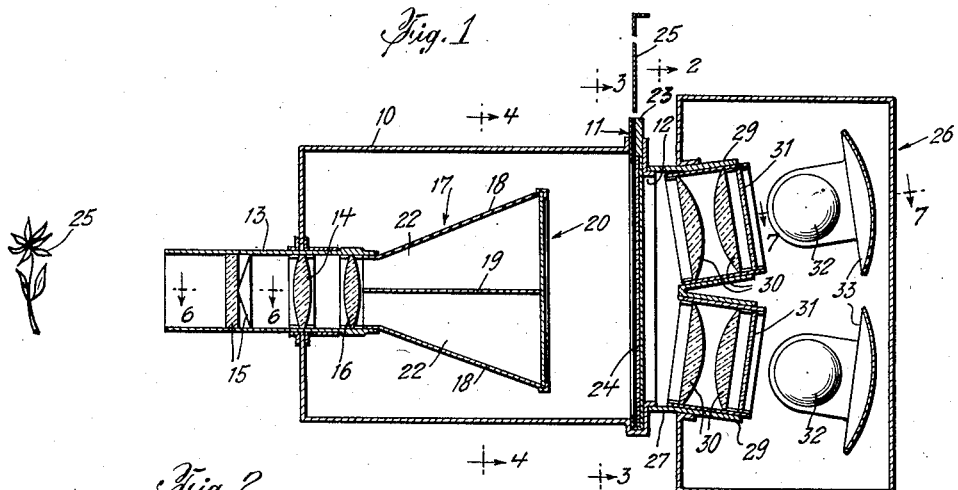
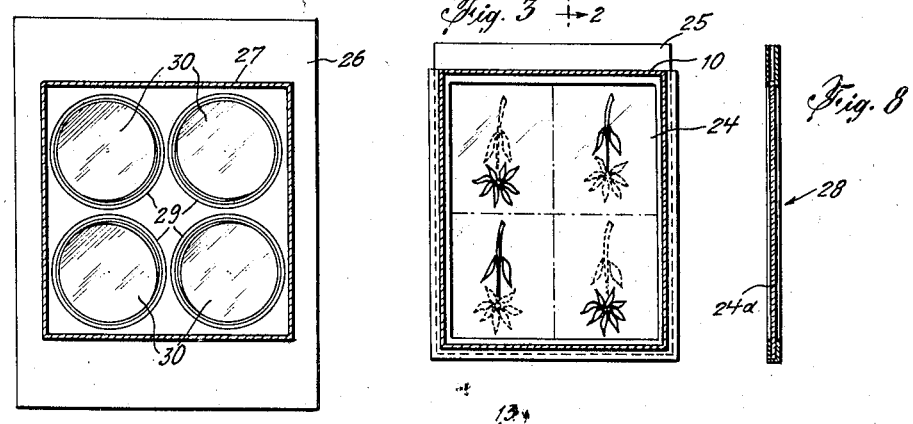
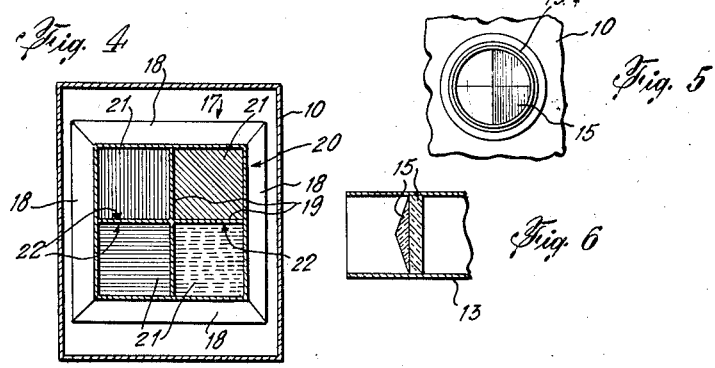
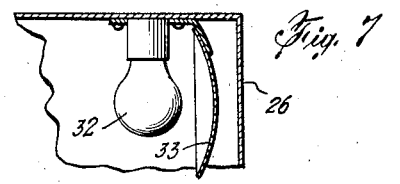
INVENTOR.
JOHN G. KLEINHENZ
BY
J. Ledermann
ATTORNEY Patented Feb. 17, 1942

2,273,112

UNITED STATES PATENT OFFICE 2,273,112

COLOR CAMERA AND PROJECTOR

John G. Kleinhenz, Rockville Centre, N. Y., assignor of fifteen per cent to Raymond F. Klaess, Rockville Centre, N. Y.

Application January 23, 1941, Serial No. 375,552

4 Claims. (Cl. 88—16.4)

This invention relates to color photography, and aims primarily to provide apparatus for the taking and the projecting of photographs in natural colors through the medium of ordinary uncolored film or plates. The photographs are taken by recording on portions of a single film or plate four color values separated from each other by the use of color filters and located in four segments of the film or plate through the use of prisms. In projection, the light is conveyed through the film and color filters into and through the lens and prisms by the use of multiple lamps, onto the screen for enlargement.

This apparatus is simple and inexpensive in both construction and operation, and requires no processing of films other than the simple development of negatives and the making of positives in the usual manner. In its operation, the image of the object to be photographed enters the camera through prisms which separate the image into four sections, diverting each image through the camera lens on to four segments of the photographic film or plate. A color filter is installed between the film and the lens, a different color being used for each segment, namely, red, green, blue and amber, and thereby recording on each segment of the film the color values permitted to pass through the above-mentioned filter. Distortion is not taken into consideration in the angle arrangement of the prisms, as all distortion within the focal plane will realign itself on projection.

With the diverging angles contained in this camera, a color control projector of special design is used, which permits the control and projection of any one or all of the color values to be shown in varying intensity of light and depth of color hues, through the medium of rheostats or liquid filters and with the light centers paralleling the angles of divergence in camera prisms, four lamps and condensers being used for the purpose.

The above and other objects will become apparent in the description below, in which characters of reference refer to like-numbered parts in the accompanying drawing, forming a part hereof. It is to be understood that the drawing serves the purpose of illustration only and is not to be interpreted to limiting the invention necessarily to the exact details shown.

Referring briefly to the drawing, Figure 1 is a sectional view of the combined camera and projector.

Figure 2 is a cross-sectional view taken on the line 2—2 of Figure 1.

Figure 3 is a cross-sectional view taken on the line 3—3 of Figure 1.

Figure 4 is a cross-sectional view taken on the line 4—4 of Figure 1.

Figure 5 is a front elevational view looking toward the camera object tube.

Figure 6 is a cross-sectional view taken on the line 6—6 of Figure 1.

Figure 7 is a cross-sectional view taken on the line 7—7 of Figure 1.

Figure 8 is a cross-sectional view of a film holder which may be used in projecting a photograph onto a screen.

Referring in detail to the drawing, the numeral 10 indicates the camera frame or box, having a side opening 11 near the rear so that a film may be slid into the box. A reduced flange 12 extends from the rear of the box, and this flange may be provided with a removable cap, not shown, which would be applied to the flange 12 when the camera alone is being used.

The tube 13 is secured to the camera in any desired manner, with the camera lens 14 remaining positioned in its normal place. Forward of the lens 14, a pair of prisms 15, mutually at right angles, is mounted, and rearward of the lens 15 a supplemental lens 16 is provided. A frusto-pyramidal housing 17, having the four walls 18, is supported in any desired manner within the box; for instance, it may be secured to the tube 13. A partition 19, cross-shaped in cross-section, divides the housing 17 into four equal compartments 22 which widen in area in proportion to the distance from the narrow or left-hand end (Figure 1) thereof. The wide end of the housing 17 is sealed by a color filter 20, which is formed of four differently colored squares 21, as shown in Figure 4. Thus, the rear end (right-hand end, Figure 1), of each compartment 22 is sealed by a filter of different color.

Any conventional or other means for removably mounting the sensitized film or plate may, of course, be provided, and the means about to be described are set forth solely for the purpose of simplification of illustration. A panel 23 is slidably and removably mounted in the opening 11, and a sensitized plate 24 is set in the forward dished-out recess therein. A handle 25 is provided on the panel 23 for withdrawing or inserting the same through the opening 11 into the camera.

When the camera is used to photograph an object, which, in the illustration is a flower 25, the light passing into the tube 13 is broken up, in the well known manner, by the prisms 15, and the separated colors leaving the prisms pass through the lenses 14 and 16. From the latter four separate images pass into the housing 17, one passing through each compartment 22, and impinge on the filter 20. Each image, in passing through its square 21 of the filter, has all colors other than that of its filter square filtered out, and the image formed in the corresponding square of the plate 24 is thus formed by only the light of that color which leaves the said square. Thus four separate images are formed on the plate, in the same juxtaposition as the four color squares 21 of the filter 20, and each image consequently may be said to have a different color value.

The method of projecting the photograph thus taken involves a literal reversal of the process just described, and is accomplished through the medium of the projecting auxiliary contained in the box 26. The forward end of this box is open and is provided with a flange 27 adapted to be secured about the flange 12. In order to insert the developed plate into the camera for the purpose of projecting the same, the panel 23 is slid out and in its place a panel 28 is substituted, with the developed plate shown at 24a, secured therein; the characteristic of the panel 28 is that it is merely a frame to hold the plate, so that light may pass through the plate. Here again, the panel 28 is shown for purposes of illustration only to simplify the elucidation of the device.

Within the opening of the projector box 26, four tubes 29 are arranged in such position that the axis of each tube is in alignment with the angle of incidence of the light from the lens 16 through one of the compartments 22. In each tube 29 a pair of condenser lenses 30 is mounted, and at the rear (right-hand, Figure 1) end of each tube a filter 31 of the same color as that of the corresponding filter square 22, is mounted. The filter 20 of the camera box may first be removed. Rearward of each filter 31, a light bulb 32, backed by a reflector 33, is mounted. These bulbs may be connected to an electric power outlet, not shown, through a rheostat or rheostats, not shown.

When the bulbs are energized, the light from each will be directed through its adjacent filter, through the condensers 30, through the corresponding square containing one image of the object, through the corresponding compartment 22, and then through the lenses 16, 14, and prisms 15, from which the composite image of the object is projected onto a screen. The various color values of the original object will thus be restored in the projected image.

A projector to serve merely as a projector without having any function of a camera, may obviously be provided as shown, by simply constructing the apparatus of Figure 1 in a unit without the detachable feature of the camera and projector, and of course the filter 20 need not be provided for the projector per se. Thus, any developed film bearing the images taken with one camera may be projected through any projector built to the same specifications, so that there would be no necessity for a picture to be projected only by one certain projector, and the color photographic apparatus set forth may obviously also be applied to existing cameras.

By varying the light intensity of one or more of the bulbs 32, by any suitable means or in any suitable manner, any one or all of the color values being projected may be varied at will to control the intensity of light and depth of color hues in the projected image.

It is apparent from the above that a practical apparatus has been provided, to function either as a camera, a projector, or both a camera and projector, which is simple and inexpensive both in cost of construction and cost of operation, for obtaining photographs and projecting the same with the use of ordinary standard unprocessed films or plates. Obviously, modifications in form and structure may be made without departing from the spirit and scope of the invention. The projector described may also be used as a simple light, or spot-light, projector, the blending of the colors being controlled by rheostats and filters.

I claim:

1. A camera comprising a case having an object lens at one end and means for removably mounting a sensitized plate or the like at the other end, a tube projecting through the camera coaxial with and surrounding said object lens, prisms mounted in said tube forward of said lens, a second lens mounted in said tube rearward of said object lens, a frusto-pyramidal housing extending rearward from said tube and having a partition dividing the same into four separate compartments increasing in area in a rearward direction, and a color filter sealing the larger end of said housing and said compartments, said filter having four separate areas formed thereon each of a different color and each forming the rear wall of one of said compartments.

2. A camera comprising a case having an object lens at one end and means for removably mounting a sensitized plate or the like at the other end, a tube projecting through the camera coaxial with and surrounding said object lens, prisms mounted in said tube forward of said lens, a second lens mounted in said tube rearward of said object lens, a frusto-pyramidal housing extending rearward from said tube and having a partition dividing the same into four separate compartments increasing in area in a rearward direction, and a color filter sealing the larger end of said housing and said compartments, said filter having four separate areas formed thereon each of a different color and each forming the rear wall of one of said compartments, said housing being secured at its reduced end to the rear end of said tube.

3. A combined camera and projector comprising a case having an object lens at one end and means for removably mounting a sensitized plate or the like at the other end, a tube projecting through the camera coaxial with and surrounding said object lens, prisms mounted in said tube forward of said lens, a second lens mounted in said tube rearward of said object lens, a frusto-pyramidal housing extending rearward from said tube and having a partition dividing the same into four separate compartments increasing in area in a rearward direction, and a color filter sealing the larger end of said housing and said compartments, said filter having four separate areas formed thereon each of a different color and each forming the rear wall of one of said compartments, the rear wall of said case having an opening therethrough, a second case having an opening through the front wall thereof, said cases being mutually joined with said openings, juxtaposed projector tubes mounted in said second case, one of said tubes being provided for each of said compartments, each of said projector tubes being positioned with its axis directed toward the center of its corresponding said compartment, lenses in each of said projector tubes, a color filter sealing the back of each of said projector tubes, and illuminating means mounted rearward of said last-named filters.

4. A projector comprising a case having a plurality of spaced tubes mounted in the front wall thereof, said tubes being positioned with their axes converging forward of said case, condensers in said tubes, color filters mounted at the rear of said tubes, illuminating means mounted rearward of said filters, a second case secured to said first case and having a plate-holding opening through the rear wall thereof adjacent the forward ends of said tubes, a lens mounted in the opposed wall of said second case, prisms mounted forward of said lens and a second lens mounted rearward thereof, and a frusto-pyramidal housing extending rearward of said last-named lens, said housing having a partition dividing he same into a plurality of compartments equal in number of the number of said tubes and increasing in area in a rearward direction with each of said compartments having its axis in alignment with the axis of one of said tubes, each of said filters being of different color.

JOHN G. KLEINHENZ.